(12) United States Patent  (10) Patent No.: US 8,341,396 B1
Nick-Baustert et al. (45) Date of Patent: Dec. 25, 2012

(54) DYNAMIC SELECTION AND INSERTION OF SIGNATURE BLOCKS DURING MESSAGE TRANSMISSION

(75) Inventors: Mary Nick-Baustert, Olathe, KS (US); Pierre Barbeau, Leawood, KS (US); Kevin Hunter, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1671 days.

(21) Appl. No.: 11/149,621

(22) Filed: Jun. 10, 2005

(51) Int. Cl.
 *H04L 29/06* (2006.01)
(52) U.S. Cl. .................................................... 713/153
(58) Field of Classification Search .................... 713/153
 See application file for complete search history.

(56) References Cited

U.S. PATENT DOCUMENTS

| | | | |
|---|---|---|---|
| 5,555,496 A * | 9/1996 | Tackbary et al. | 705/27 |
| 7,030,730 B1 * | 4/2006 | Zondervan | 340/7.29 |
| 7,478,134 B2 * | 1/2009 | Doan et al. | 709/206 |
| 2005/0015457 A1 * | 1/2005 | Warasawa | 709/207 |

OTHER PUBLICATIONS iVista 4.1 Pro User's Guide—Video email (2002).
Webmail Utility, 32 pages, downloaded from http://www.linux.org.za/lists-archives/glug-0104/msg00077.html (circa 2001).

* cited by examiner

Primary Examiner — Philip Chea
Assistant Examiner — Daniel Hoang

(57) ABSTRACT

A method is provided for inserting signature blocks into a message being transmitted along a communication path between a first client station and a second client station. The method includes a step of receiving, at an intermediate node in the communication path, a message transmitted from the first client station destined for delivery to the second client station. The message bears a sender-identifier (e.g., email address) and a recipient-identifier (e.g., email address). The method further includes a step of selecting, based at least in part on the sender-identifier, a predefined signature block for the message. The method further includes a step of inserting the selected signature block into the message. The signature block to be inserted may be based on both the sender identifier and the recipient identifier.

13 Claims, 5 Drawing Sheets

DYNAMIC SELECTION AND INSERTION OF SIGNATURE BLOCKS DURING MESSAGE TRANSMISSION

BACKGROUND

The present invention relates to telecommunications and, more particularly, to composition and transmission of messages between network endpoints.

It is generally known for a messaging application to programmatically insert a signature block into an electronic message being composed by a user. A typical signature block functions as the user's "signature," in that it usually sets forth the user's name and other contact information such as address and phone number. Alternatively, an inserted signature block could take other forms, providing other designated information and/or media (e.g., graphics, photo, video, sound, etc.) A typical messaging application, such as Microsoft Outlook, for instance, can be configured such that the computer generating the email message automatically inserts a signature block into a message being composed by a user, upon initial creation of the message or upon receipt of user instruction (e.g., through selection of a designated menu or toolbar item).

The present inventors have appreciated that there are circumstances where a user may wish to include a custom signature block for their messages, but the transmission of the signature block itself is detrimental in one way or another, for example consumes computing resources needed for other applications, consumes battery power, consumes excessive bandwidth where the bandwidth is limited, causing other applications to slow down, or a transaction cost is levied based on the amount of data transmission.

An example of a situation where this might occur is where the transmitting device or client station is a wireless communications device such as a cellular telephone or personal digital assistant. Consider further an example where the wireless communications device sends lots of email messages, each one having a signature block consisting of both text and other media, e.g., a photo. The present inventors have appreciated that in this situation, and indeed in other situations, it is preferable to allow the user to have their signature block inserted into their messages, but to have this insertion performed not at the client station (as in the prior art) but rather in a downstream node or entity in the communication path between the sender and the recipient. This disclosure describes how to achieve this result. In the wireless communications device scenario, the benefit of the invention allows for less power consumption at the wireless device (prolonging battery life), less consumption of limited bandwidth between the wireless device and the radio access network, faster processing of the messaging application and other applications on the wireless device, lower transaction costs (since the signature block is not transmitted over the air interface to the radio access network), and still others.

SUMMARY

The present invention is directed to a method and system for dynamically inserting a signature block into a message. Unlike the prior art situation where the signature block is inserted locally by the computing device that creates the message, here the signature block is inserted by another entity or node (e.g., an intermediary server on a network) during transmission of the message from a sender to a recipient. In a further aspect, the signature block itself will be selected based at least in part on an identifier of the sender (e.g., their email address, MIN number, network address, etc.), or, alternatively, based at least in part on identifiers of both the sender and the recipient.

In accordance with an exemplary embodiment, a network intermediary (e.g., gateway between a radio access network and a wireless service provider enterprise network) that sits within a communication path between a message sender and message recipient will receive an electronic message that has been transmitted from the sender for receipt by the recipient. Upon receipt of the message, the intermediary will query a signature database, which may take the form of a subscriber profile store, to obtain a predefined signature block associated with the sender. The signature block may, for example, set forth the sender's name, address and/or other information, include attached media files, etc. The intermediary inserts the signature block into the message. The intermediate transmits the message, including the signature block, along to the recipient, either directly or indirectly, e.g., to a email server for the recipient.

By way of example, upon receipt of a message transmitted from John Doe, for receipt by Jane Smith, the intermediary may append to the end of the message body a signature block that reads "John Doe, 123 Main Street, Chicago, Ill.," and so forth.

The subscriber profile store may further define multiple signature blocks associated with the sender and may associate one or more recipients (e.g., a category of recipients, e.g., co-workers) with one of the signature blocks and one or more other recipients (e.g., another category of recipients, e.g., family members or friends) with another one of the signature blocks. By way of example, for family members of the sender, the signature block may set forth the sender's nickname and a photo of their pet, whereas, for business acquaintances of the sender, the signature block may set forth the sender's more formal business name, work phone and fax number, office address, etc. The intermediary may then query the profile store to determine, based on the identities of the sender and recipient, which signature block to insert, and the intermediary may insert that signature block and then transmit the message, including the selected signature block, along to the recipient.

As presently contemplated, a user can provision one or more signature blocks, as well as associations with one or more recipients, through an online (web-based) provisioning interface hosted by a web server. For instance, through an online interface, the user may type one or more signature blocks, attach any associated media files, and the user may fill in a table that correlates each of a plurality of recipients (by e-mail address, SMS address, or the like) with a respective signature block.

The invention can be particularly advantageous in a communication system where the sender incurs a transmission cost that is based on the quantity of data transmitted through an access channel from the sender, such as in a cellular wireless communication system for instance. With the benefit of the invention, the message transmitted through the access channel from the sender need not include a signature block. Rather, a downstream intermediary can conveniently intercept the message, add an appropriate signature block into the message, and then transmit the message along to the recipient, either directly or indirectly.

The identity and functionality of the intermediary node that inserts the signature block is not important. The intermediary could take the form of a general purpose computing device, a network server, network gateway, authorization or accounting server, web server, or other device. Furthermore, the type of message for which the signature block is inserted is also not particularly important. While the present disclosure uses as an example a signature block for an email message, the invention is applicable to other message types, for example Short Message Service (SMS) message, instant message, or other message type either now known or later developed.

DETAILED DESCRIPTION OF PREFERRED EMBODIMENT

Figure 1:
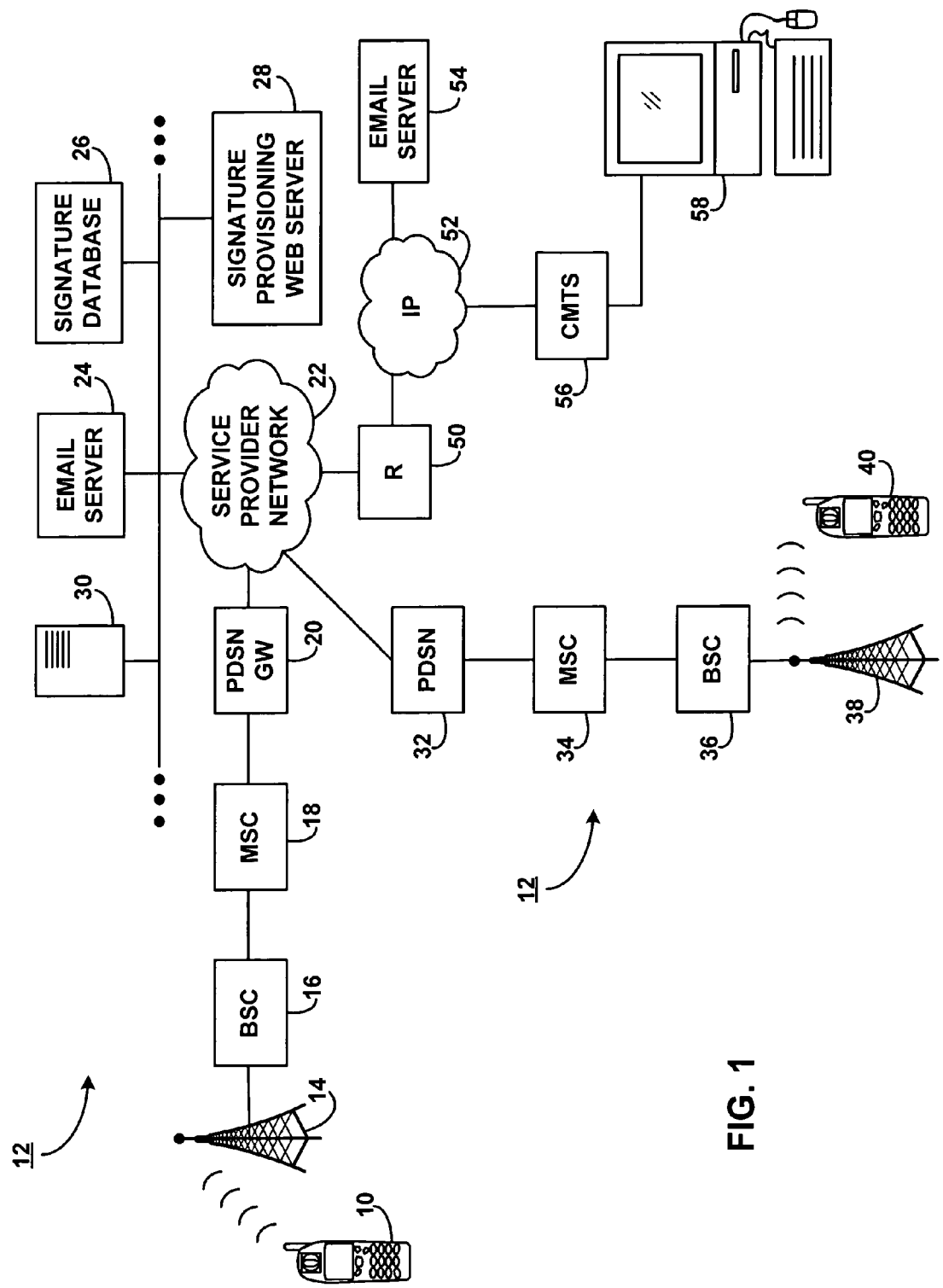
FIG. 1 is a diagram of a representative network environment in which the invention can be practiced.

Referring now to FIG. 1, a network environment is shown which provides for a method and system for insertion of signature blocks into messages by an entity in the communication path between a first or sending client station originating the message and a recipient client station. A wireless device 10 such as a cellular telephone or personal digital assistant is shown which is the sending client station in the illustrated embodiment. The recipient device for the message could be another wireless device such as a cell phone 40, or a conventional terminal or computing device 58 on a land-based network. If the invention is practiced in a wireless environment, the entity that performs the insertion of the signature block will typically but not necessarily be a network node on or connected to the wireless service provider enterprise network 22, such as the packet data serving node (PDSN) gateway 20, email server 24, or other network device, shown generally as server or computing unit 30.

The network environment of FIG. 1 includes a radio access network 12 by which the wireless device 10 communicates over an air interface with the wireless service provider enterprise network 22, e.g., in order to engage in voice or data communications. The radio access network 12 may include a conventional CDMA cellular telephony network which includes a set of base station antennae 13 each of which is connected to a base station controller 16, mobile switching center 18 and PDSN gateway 20. The PDSN gateway 20 couples the radio access network 12 to a packet switched Internet Protocol backbone network 22 that is typically the enterprise network of a wireless service provider such as Verizon, Sprint, XCingular, etc. The elements of the radio access network 12 are conventional and therefore a detailed description is not necessary. The PDSN gateway includes network access and routing software to route messages from wireless devices 10 onto the network 22 for transmission to destinations on the network 22 (or on intermediate networks connected to the network 22, such as the IP network 52 (e.g., Internet), via a router 50.

The service provider network 22 may include several additional nodes that are used for handling messaging functions for the wireless subscribers. These nodes may include an email server 24 for storage of email messages for its subscribers, a database 26 including a profile store for subscribers, which may also specifically include signature blocks created by the subscribers for insertion into the subscriber's messages. The enterprise network 22 may also include a signature provisioning web server 28, which the subscribers access to interactively create a signature block for storage in the profile store database 26.

Where the message is an email message and the recipient is a wireless device 40 which is also a subscriber to the service provider, the message is intercepted at the gateway 20, the gateway 20 queries the signature database 26 for the signature block to insert, the block is forwarded to the gateway 20 and the signature is added to the message and send to the email server 24. Where the message is an SMS message, instant message, or other type of message sent directly to the recipient client station 40, the signature block is inserted into the message at gateway 20 and then sent directly to the client station 40.

Where the recipient is not a subscriber and instead uses the computer 58, the same process happens except that the email message is sent via router 50 for transmission over network 52 to the email server 54 for the recipient. The user of computer 58 accesses their email via a network access device, e.g., remote access server or cable modem termination system (CMTS) in the event the computer 58 has a cable modem for internet access.

Figures 2, 3:
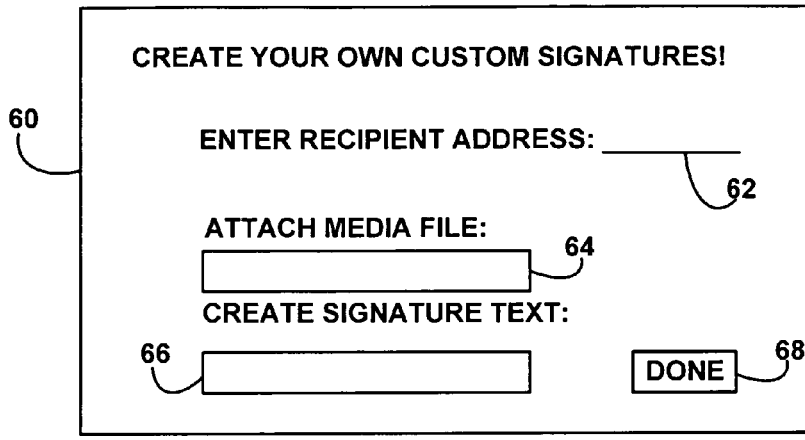
FIG. 2 is an illustration on a web provisioning interface available on the signature provisioning web server of FIG. 1, where a user can create a customized signature for different email addresses.
FIG. 3 shows a table stored in the signature database of FIG. 1 in which email subscribers have different signature blocks assigned to different email addressees. For example subscriber Bob Preston, with email address Bobpreston@sprintmail.com, has one signature file for recipient frank@bigco.com (signature file email1), recipient phil@juno.net has a second signature file (email2), etc., and a default signature file (defemail) for all other recipients. Similarly, subscriber Donna Jones (donnajones@sprintmail.com) has her own set of customized signature files for different recipients.

FIG. 2 is an illustration on a web provisioning interface 60 available on the signature provisioning web server 28 of FIG. 1. The provisioning interface can take the form of an HTML web page or other format. The provisioning interface allows the subscriber (user of device 10) to interactively create a single customized signature for either all of their addressees (e.g., all the contacts in their contacts folder), or create customized signature blocks for different addressees. The details on the user interface features are not particularly important and the example of FIG. 2 is provided by way of example and not limitation. The interface 60 provides a field 62 for the user to enter the recipient address (e.g., email address), a field 64 where they can attach any media file to go with their signature, and a field 66 where they can type text for their signature block. The media file attached in field 64 could be a video file, audio file, digital photograph(s), combination thereof, or other type of media. When they are done, they can click on the "done" icon 68. This action causes the media file and signature text to be combined into a single signature block file which is associated with the addressee entered in field 62. The resulting signature block file is sent to the profile store database 26 of FIG. 1, and added to the profile for the user. Obviously, the user interface feature 60 can be used repeatedly to create signature blocks for different addressees. If the user wants a single signature block to cover all addressees, they can type in "default" in field 62, enter the media file (if any) in field 64 and the text in field 66, and then click done 68. The block created when using default in field 62 will apply to all addressees for which there is no customized signature block created. The user interface 60 of FIG. 2 could be augmented to include additional features, such as to display the contacts list and allow the user to select contacts rather than type them into the field 62; a feature to select groups of contacts and enter one signature block for all members of the group, and still other features.

FIG. 3 shows a table stored in the user profile/signature database 26 in which email subscribers 70, 90, 110, have different signature blocks assigned to different email addressees. For example subscriber Bob Preston 70, with email address Bobpreston@sprintmail.com, has one signature block file for recipient 72 frank@bigco.com (signature file email1 78), recipient 72 phil@juno.net has a second signature file (email2 80), etc., and a default signature file (defemail 82) for all other recipients (indicated by the legend default 76). Similarly, subscriber Donna Jones 90 (donnajones@sprintmail.com) has her own set of customized signature files for different recipients 92, 94 and 96, represented by signature block files 98, 100, and 102. Still other recipients 100 will have other contacts 112 which are associated with their own signature block files 114. The database 26 may store other information for the subscribers 70, 90, 110, including information generally providing a subscriber profile which may be used in many possible ways, but such details are omitted from this discussion in order to avoid obfuscation of the disclosure.

Figure 4:
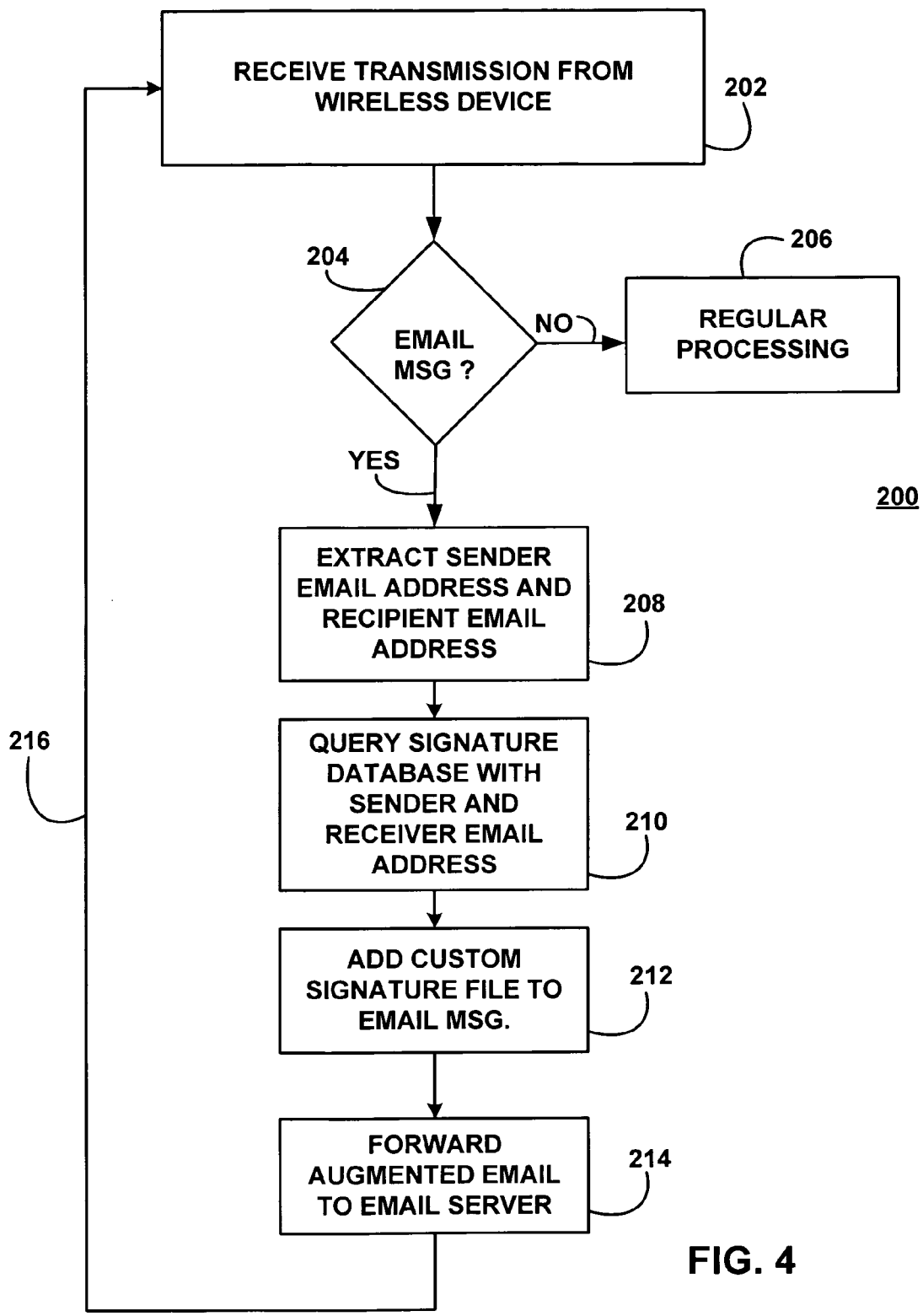
FIG. 4 is a flow chart of processing instructions executed at the gateway node of FIG. 1, by which the gateway node obtains a signature block file for a message transmitted through the gateway and adds it to the message. The signature block file to insert depends on both the sender and recipient address. The processing instructions of FIG. 4 could also be executed by some other node or entity in the network of FIG. 1, for example in an email server.

FIG. 4 is a flow chart of processing instructions 200 executed at the PDSN gateway node 20 of FIG. 1, by which the gateway node 20 obtains a signature block file for a message transmitted through the gateway 20 and adds it to the message. In the example of FIG. 4, the signature file to be inserted depends on both the sender and recipient identity (e.g., email address). The processing instructions of FIG. 4 could also be executed by some other node or entity in the network of FIG. 1, for example in an email server.

The processing instructions 200 of FIG. 4 include a first processing step 202 of receiving a transmission from a wireless device. This transmission will come from the elements of the radio access network 12 of FIG. 1. The transmission will typically identify the wireless device originating the transmission, e.g., by inclusion of an IP address, email address, identification number or other identification means included with the transmission (e.g., in a transmission header).

At step 204, the gateway checks a field of the transmission to determine whether this message is a message type that may include a signature block, for example, an email message. If the check at step 204 is negative, regular processing 206 proceeds, the details of which are not important.

If, at step 204, the check indicates that the transmission is a type that is associated with a signature block, the gateway 20 extracts the sender identification and recipient identification from the message at step 208. This could take the form of inspection of header fields for sender email address and recipient email address.

At step 210, the gateway queries the signature database 26 with a message that includes both the sender and recipient email addresses. This message is sent over the service provider network 22 to the signature database 26. The database (or database server) executes a search for the signature file that is associated with the sender and recipient address and returns the signature block file (e.g., signature block file 78 in FIG. 3, where the sender is bobprestion@sprintmail.com and the recipient is frank@bigco.com).

At step 212, the gateway 20 appends the signature block file into the message from the originating client station.

At step 214, the gateway 20 forwards the message augmented with the signature file to the recipient (either directly or indirectly). For example, if frank@bigco.com uses computer 58 in FIG. 1, the message is sent to Frank's email server 54 and he accesses it from his computer 58.

The process 200 repeats continuously, as indicated by arrow 216. It will also be appreciated that the process may work in parallel for a multitude of messages received at gateway 20 and at all other gateways of the wireless service provider.

Note that in the process just described, the user of wireless client station 10 simply has to enter their signature blocks at the web provisioning interface (FIG. 2) and then can send all the emails they want with whatever signature blocks they so desire, and none of the signature blocks travel over the radio access network 12. This relieves the radio access network 12 of having to handle this data. Furthermore, the processing time and power consumption to process and transmit the signature blocks at the client station is completely avoided. Thus, the invention is particularly advantageous in a communication system such as a wireless CDMA network where the sender incurs a transmission cost (either financial or otherwise) that is based on the quantity of data transmitted through an access channel from the sender. With the benefit of the invention, the message transmitted through the radio access channel from the sender need not include a signature block. Rather, the downstream intermediary (e.g., gateway 20) can conveniently intercept the message, add an appropriate signature block into the message, and then transmit the message along to the recipient, either directly or indirectly.

The identity and functionality of the intermediary node that inserts the signature block is not important. The intermediary could take the form of a general purpose computing device, a network server, network gateway, authorization or accounting server, web server, or other device. Furthermore, the type of message for which the signature block is inserted is also not particularly important. While the above example uses as an example a signature block for an email message, the invention is applicable to other message types, for example Short Message Service (SMS) message, instant message, or other message type either now known or later developed.

Figure 5:
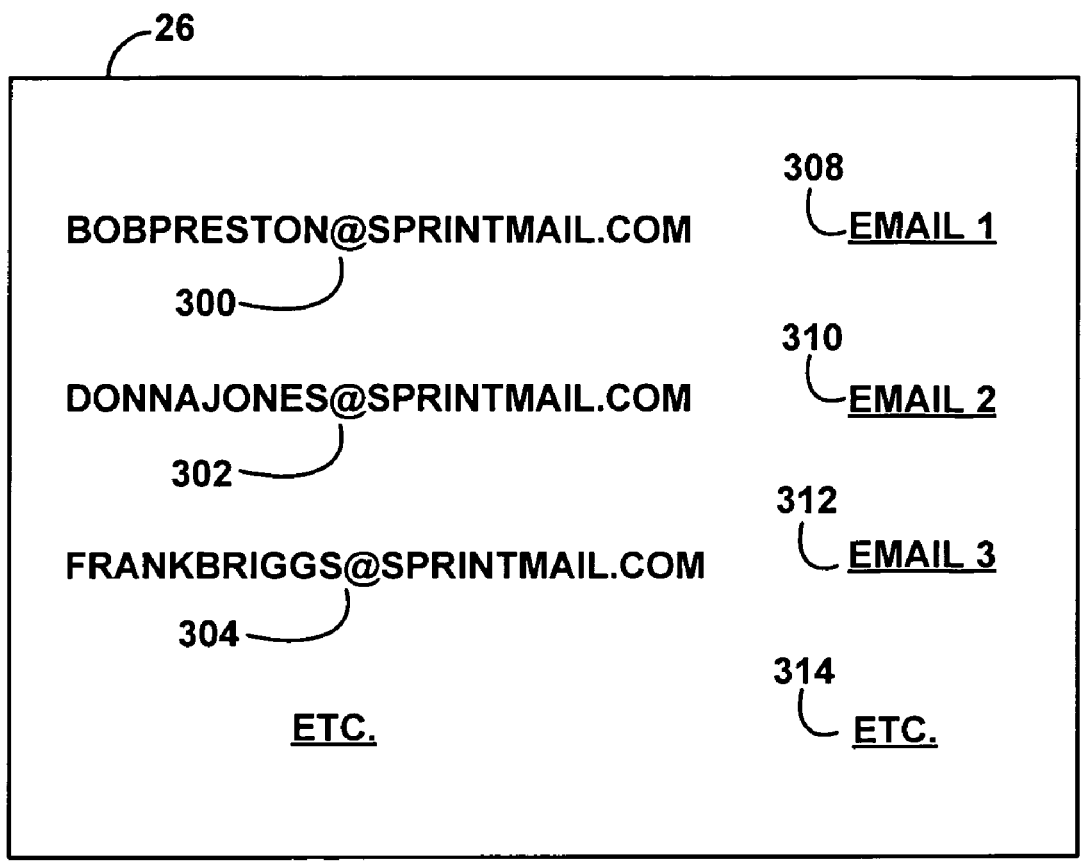
FIG. 5 is an illustration of a table stored in the signature database of FIG. 1 wherein each subscriber has one signature block.

FIG. 5 is an illustration of a table stored in the signature database 26 of FIG. 1 wherein each subscriber 300, 302, 304, 306, has created just one signature block. For example, subscriber 300 has a signature block file 308, subscriber 302 has a file 310, subscriber 304 has a signature block file 312, and other subscribers 306 have their own signature blocks indicated at 314. The insertion of a signature block in the example of FIG. 5 does not depend on the addressee, only on the address of identity of the sender.

Figure 6:
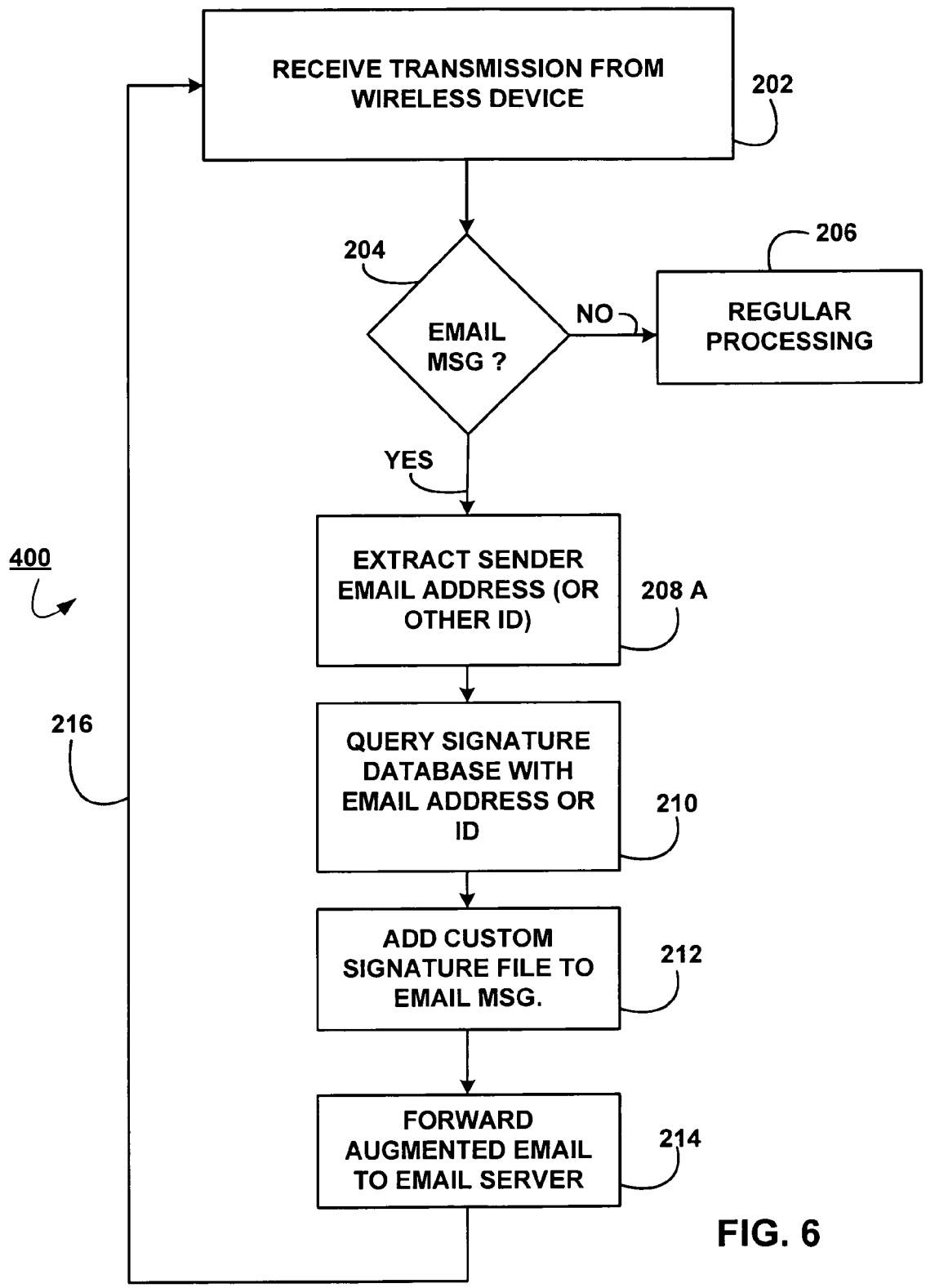
FIG. 6 is a flow chart of processing instructions executed at the gateway node of FIG. 1, by which the gateway node obtains a signature file for a message transmitted through the gateway and adds it to the message. The signature file to insert depends on just the sender address, e.g., using the table of FIG. 5. The processing instructions of FIG. 6 could also be executed by some other node or entity in the network of FIG. 1, for example in an email server.

FIG. 6 is a flow chart of processing instructions executed at the gateway node 20 of FIG. 1, by which the gateway node 20 obtains a signature file from the database of FIG. 5 for a message transmitted through the gateway 20 and adds it to the message. The signature block file to insert depends on just the sender address, e.g., using the table of FIG. 5. The processing instructions of FIG. 6 could also be executed by some other node or entity in the network of FIG. 1, for example in an email server.

The instruction process 400 of FIG. 6 includes steps 202, 204 and 206 which are the same as for FIG. 4. At step 208A, the gateway extracts the sender identification (e.g., email address). At step 210, the gateway queries the database 26 with the sender address, and receives in response the signature block file (e.g., file 308 of FIG. 5). At step 212 the gateway adds the signature block file to the message and at step 214 forwards the augmented email to an email server for delivery to the recipient.

While presently preferred and alternative embodiments have been described, variation from the illustrated embodiments is possible without departure from the scope of the invention. The scope is to be determined by reference to the appended claims.

The invention claimed is:

1. A method for inserting signature blocks into messages transmitted along a communication path between a first wireless client station and a second client station, comprising:
   receiving, at an intermediate node in the communication path, a message transmitted from the first wireless client station, destined for delivery to the second client station, the message bearing a sender-identifier and a recipient-identifier, wherein the message does not include a signature block;
   determining based on a field of the message whether the message is of a message type that is to include a given signature block;
   in response to a determination that the message is of a message type that is to include a given signature block, the intermediate node querying a database containing signature blocks for a plurality of subscribers to a wireless service provider network so as to select, based at least in part on the sender-identifier and the recipient-identifier, a predefined signature block for the message, wherein each subscriber has one or more signature blocks for different message recipients stored in the database, wherein the database includes multiple signature blocks for a given subscriber and each signature block for the given subscriber is associated with one or more recipients;
   the intermediate node inserting the selected signature block into the message and forwarding the message to the second client station;
   providing a web provisioning server wherein the first wireless client station is configured to create a customized signature block and assign the customized signature block to a particular message recipient or group of recipients using the web provisioning server; and
   storing the customized signature block in the database.

2. The method of claim 1, wherein the intermediate node comprises an email server.

3. The method of claim 1, wherein the intermediate node comprises a gateway node coupling a radio access network to a wireless service provider enterprise network and wherein the inserting step is performed at the gateway node.

4. The method of claim 1, further comprising the step of sending the message, including the signature block, either directly or indirectly to the second client station.

5. The method of claim 1, wherein the first wireless client station comprises a wireless communications device.

6. The method of claim 5, wherein the wireless communications device comprises a cellular telephone.

7. A system for processing messages, comprising:
   a database containing signature blocks for a plurality of subscribers to a wireless service provider network, wherein each subscriber has one or more signature blocks for different message recipients stored in the database, wherein the database includes multiple signature blocks for a given subscriber and each signature block for the given subscriber is associated with one or more recipients;
   a network node, comprising a processor and a memory storing software instructions for receiving from a transmitting wireless client device a message that does not include a signature block and determining based on a field of the message whether the message is of a message type that is to include a given signature block, the instructions further for in response to a determination that the message is of a message type that is to include a given signature block inserting a signature block into the message on behalf of the transmitting wireless client station originating the message, wherein the signature block is predetermined, and wherein the instructions are further for querying the database so as to select the signature block for insertion into the message based on a sender identifier and a recipient identifier contained in the message; and
   a web provisioning server enabling client stations to create customized signature blocks and assign the customized signature block to a particular message recipient or group of recipients.

8. The method of claim 1, wherein determining whether the message is of a message type that is to include a signature block comprises determining whether the message is an email message.

9. The method of claim 1, wherein determining whether the message is of a message type that is to include a signature block comprises sending a query message over the wireless service provider network to the database containing signature blocks.

10. The method of claim 1, further comprising:
    sending the message with the inserted selected signature block from the intermediate node to an email server for delivery to a recipient identified by the recipient-identifier,
    wherein the intermediate node comprises a gateway node coupling a radio access network to a wireless service provider enterprise network and wherein the inserting step is performed at the gateway node.

11. The method of claim 1, wherein the signature block comprises text plus either audio or visual media.

12. The method of claim 1, wherein the message includes a header field comprising the sender-identifier and the recipient-identifier and a field of transmission, and wherein determining whether the message is of a message type that is to include a given signature block comprises checking the field of transmission.

13. The method of claim 1, wherein determining whether the message is of a message type that is to include a given signature block comprises determining a type of messaging service for transmission of the message.

* * * * *